UNITED STATES PATENT OFFICE.

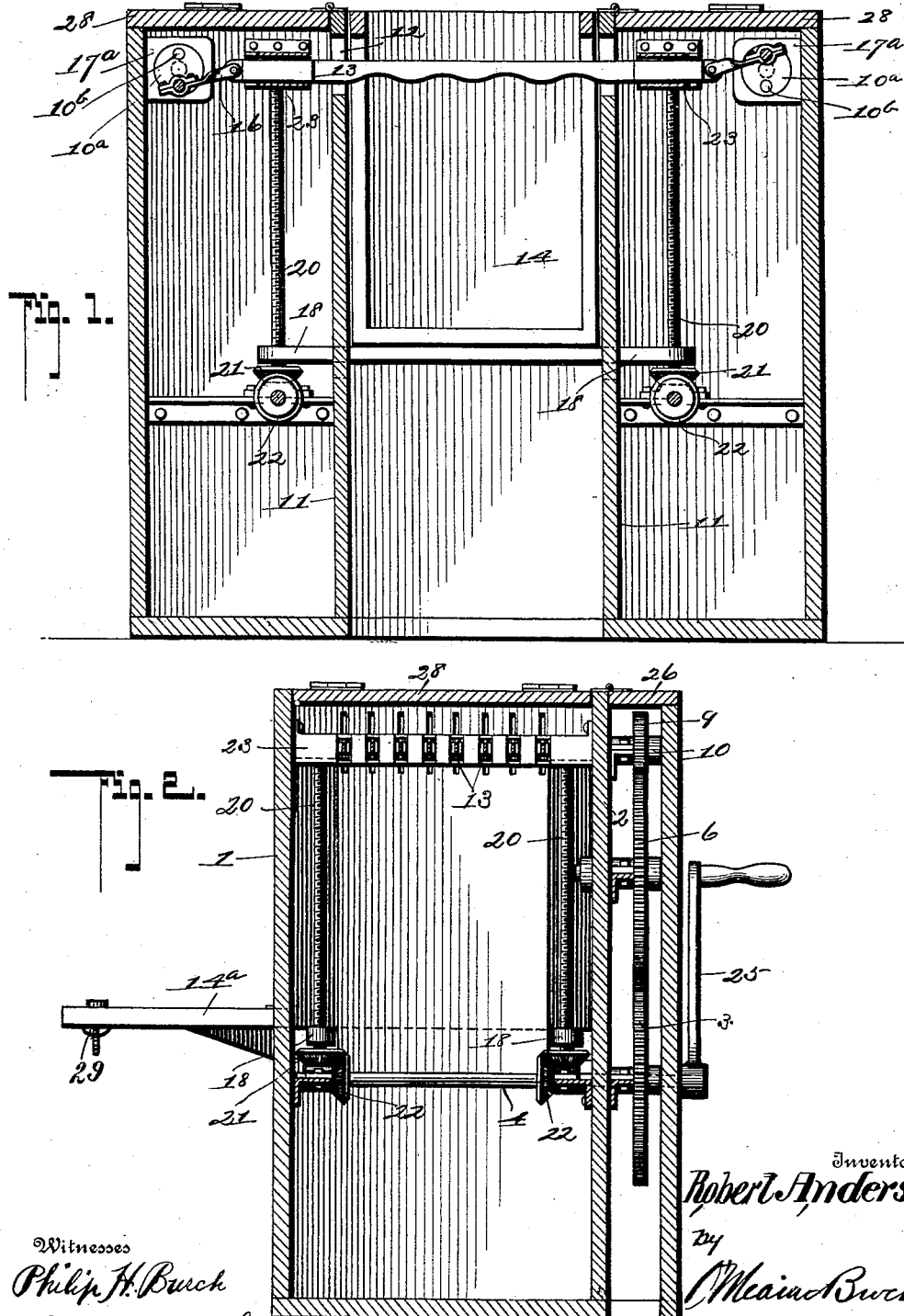

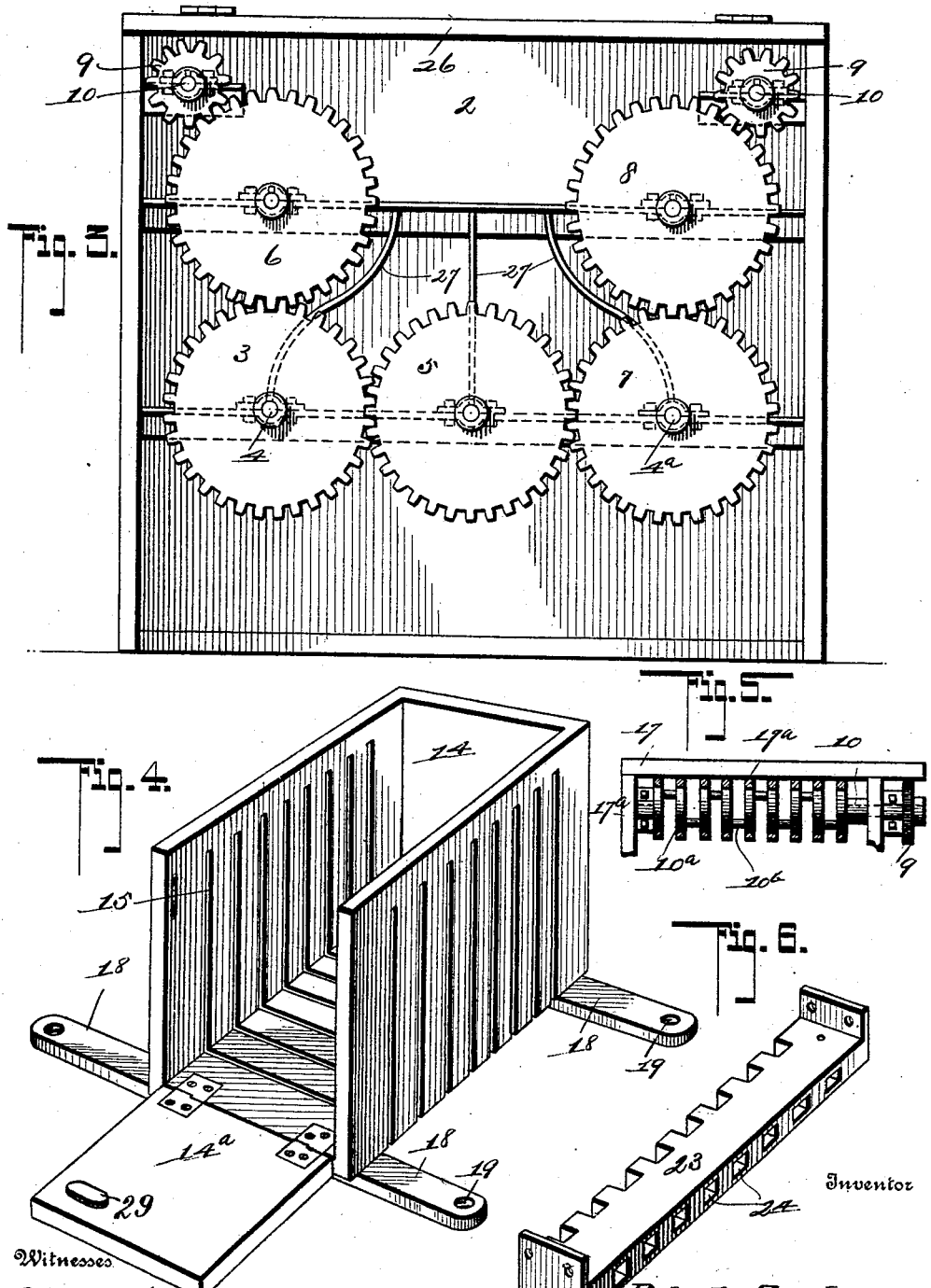

ROBERT ANDERSON, OF ALLEGHENY, PENNSYLVANIA.

BREAD-CUTTER.

No. 904,593.  Specification of Letters Patent.  Patented Nov. 24, 1908.

Application filed November 11, 1907. Serial No. 401,715.

*To all whom it may concern:*

Be it known that I, ROBERT ANDERSON, a subject of the King of England, residing at Allegheny, in the county of Allegheny and State of Pennsylvania, have invented a new and useful Improvement in Bread-Cutters, of which the following is a specification.

This invention relates to a bread cutter and has for its object the cut at one time of a loaf of bread into a large number of slices, and has also for its object the disposal of the crumbs caused by the action of the cutting blades.

The invention consists of the novel features of construction hereinafter described, pointed out in the claims, and shown in the accompanying drawings in which:—

Figure 1 is a vertical section taken through the device; Fig. 2 is a transverse section at right angles to the section taken in Fig. 1; Fig. 3 is a rear elevation, the back blade being removed; Fig. 4 is a detail perspective view of a vertically removable bread carrier; Fig. 5 is a plan view of the cutter shaft; Fig. 6 is a perspective view of a guide blade through which the cutters work.

In these drawings 1 represents a suitable casing which is provided with a false rear partition 2 and suitably journaled between said rear partition 2 and the back of the casing is a gear 3 mounted on a shaft 4 which gear 3 drives idle gears 5 and 6. The gear 5 drives the gear 7 mounted upon a horizontal shaft 4ª which in turn drives an idle gear 8. The gears 6 and 8 drive pinions 9 which are mounted upon a crank shaft 10 which will be more fully described hereafter. The casing 1 is also provided with two transverse partitions 11 which are cut out as shown at 12 for the passage of the cutting blades 13 which blades are serrated on their lower edges. Moving vertically between the partitions 11 is a casing 14 which is provided with a plurality of slots 15 which slots extend across the bottom of the casing 14 and partially up the sides, and are equal in number to the number of cutting blades. A hinged platform 14ª extends from the front of the casing 14, which casing is open in front. The cutting blades 13 may be of any number and are given a reciprocating motion in the following manner. Each blade is connected at the ends by a pivoted strap 16 to a crank portion of the shaft 10. This shaft I prefer to fill up by forming it of a plurality of disks 10ª which are connected by pins 10ᵇ eccentrically arranged and alternately off set with respect to each other. To relieve a shaft thus constructed of strain I provide a bracket 17 which is provided with parallel blades 17ª each of which is cut out to receive one of the disks 10ª, the disks rotating in the bracket blades, thus preventing any sagging, bending or twisting of the shaft 10 in order that the casing 14 which receives the loaf of bread may move vertically during the operation of the cutting knives and said casing is provided with lateral extensions 18 which are provided with threaded openings 19 and threaded rods 20 work through said extensions and carry at their lower ends bevel gears 21 which mesh with bevel gears 22 two of which are carried by a shaft 4 and two by shaft 4ª. The upper ends of these threaded rods 20 are suitably journaled in a frame 23 which frame also acts as a guide block for the cutting blades being provided with guide openings 24 through which said blades work. A suitable handle 25 is fixed upon the rear outer end of shaft 4. A hinged cover 26 closes the spaces between the back of the casing 1 and the partition 2 and by raising the same the gearing can be easily reached for oiling. To render it easy to oil the gears 3, 5 and 7 lubricating pipes 27 are arranged as shown in Fig. 3. Hinged lids 28 are also employed to cover that part of the casing 1 in which are arranged shafts 10 and the threaded rods 20, all of which can be readily lubricated by lifting said covers.

The operation of the device is as follows:—The platform 14ª is opened out as shown in Fig. 2 and after closing the platform 4, the loaf of bread is placed in position within the casing 14, which casing is shown in its normal position in the drawings and the handle 25 is turned. Through the gears 3, 5, 6, 7, and 8 the pinions 9 are rotated, thus rotating shafts 10 and reciprocating the blades. This also rotates the shafts 4 and 4ª, and thereby the bevel gears 22 and bevel gears 18 and the threaded rods 20. This causes the casing 14 to move vertically thus lifting the loaf and as the blades cut through the loaf they sink into the slots 15 extending across the bottom of the casing 14. The blades therefore pass entirely through the loaf and the crumbs follow through the slots 15 into the space below the casing 14.

Any suitable means such a turn button 29 can be employed for holding the platform 14ª in closed position.

Having thus described my invention what I claim as new and desire to secure by Letters Patent is:—

1. A device of the kind described consisting of horizontally reciprocating blades, and vertically movable casing slotted to receive said blades, and common means for reciprocating the blades and lifting the casing.

2. A device of the kind described comprising a casing, shafts having crank portions mounted therein, cutting blades arranged between said shafts, links pivotally connecting opposite ends of the blades to the crank portions of said shafts, and slotted casing to receive the bread, the blades working through said slots, and slots extending down the sides and across the bottom of the casing, and common means for rotating the shafts and lifting vertically the slotted casing.

ROBERT ANDERSON.

Witnesses:
C. DOLLHOPF,
W. H. MASSEY.